United States Patent Office 3,478,897
Patented Nov. 18, 1969

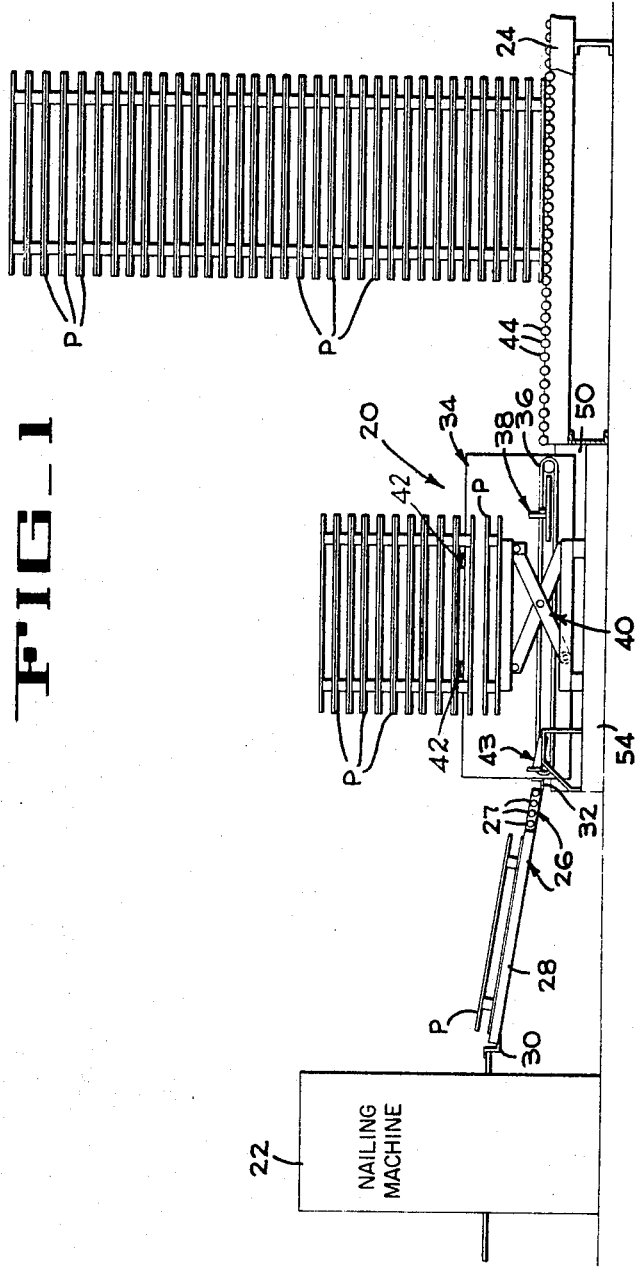

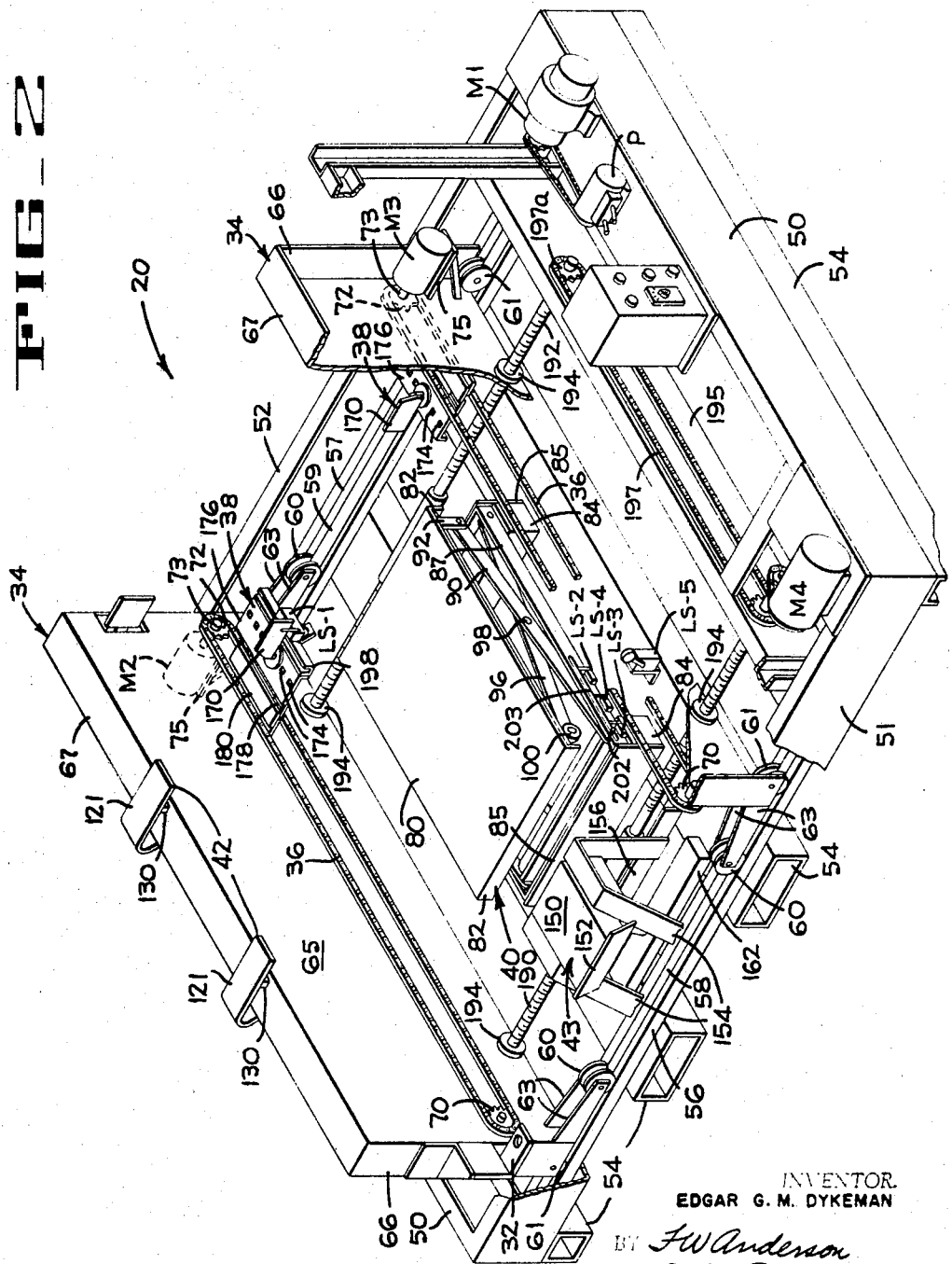

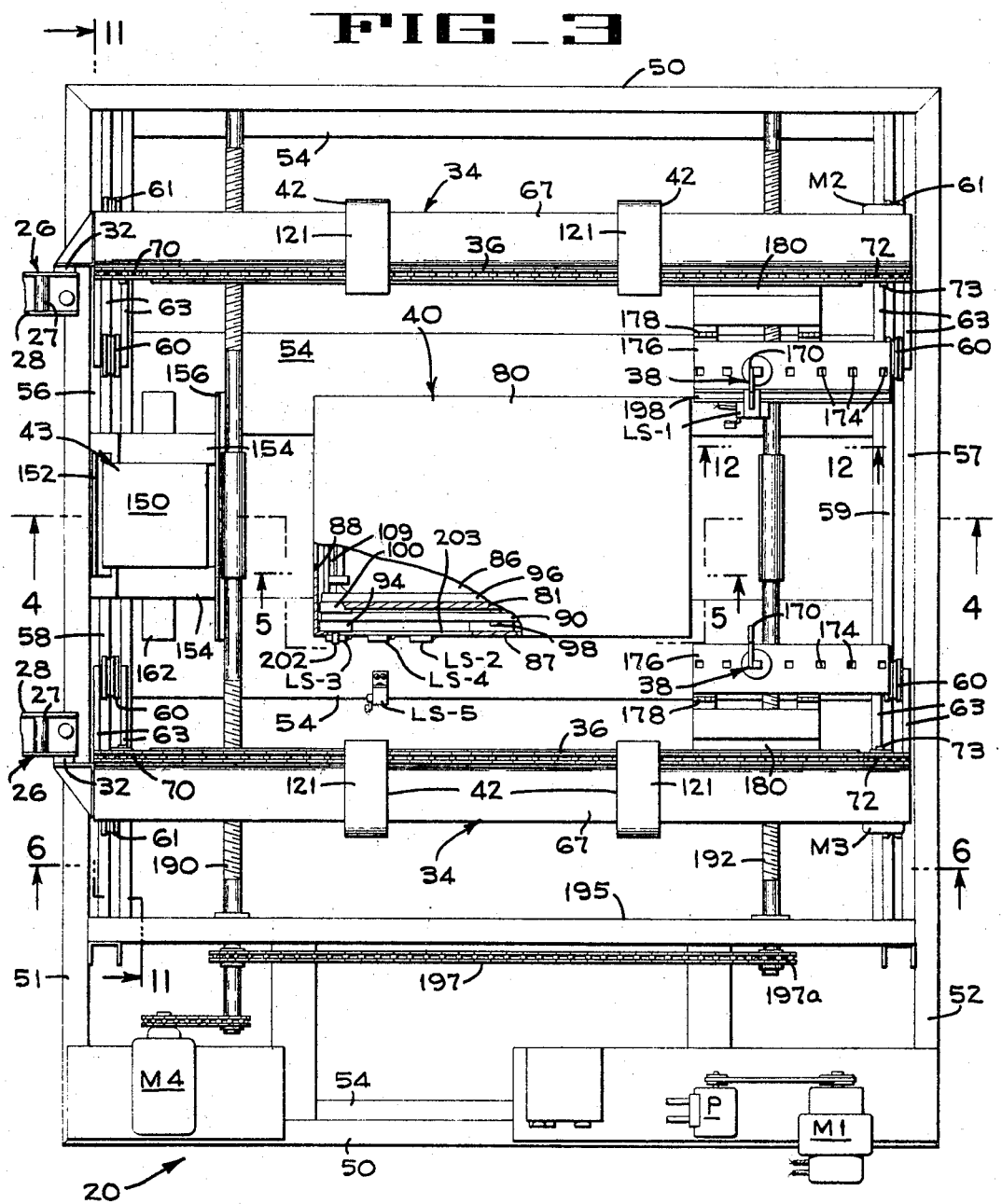

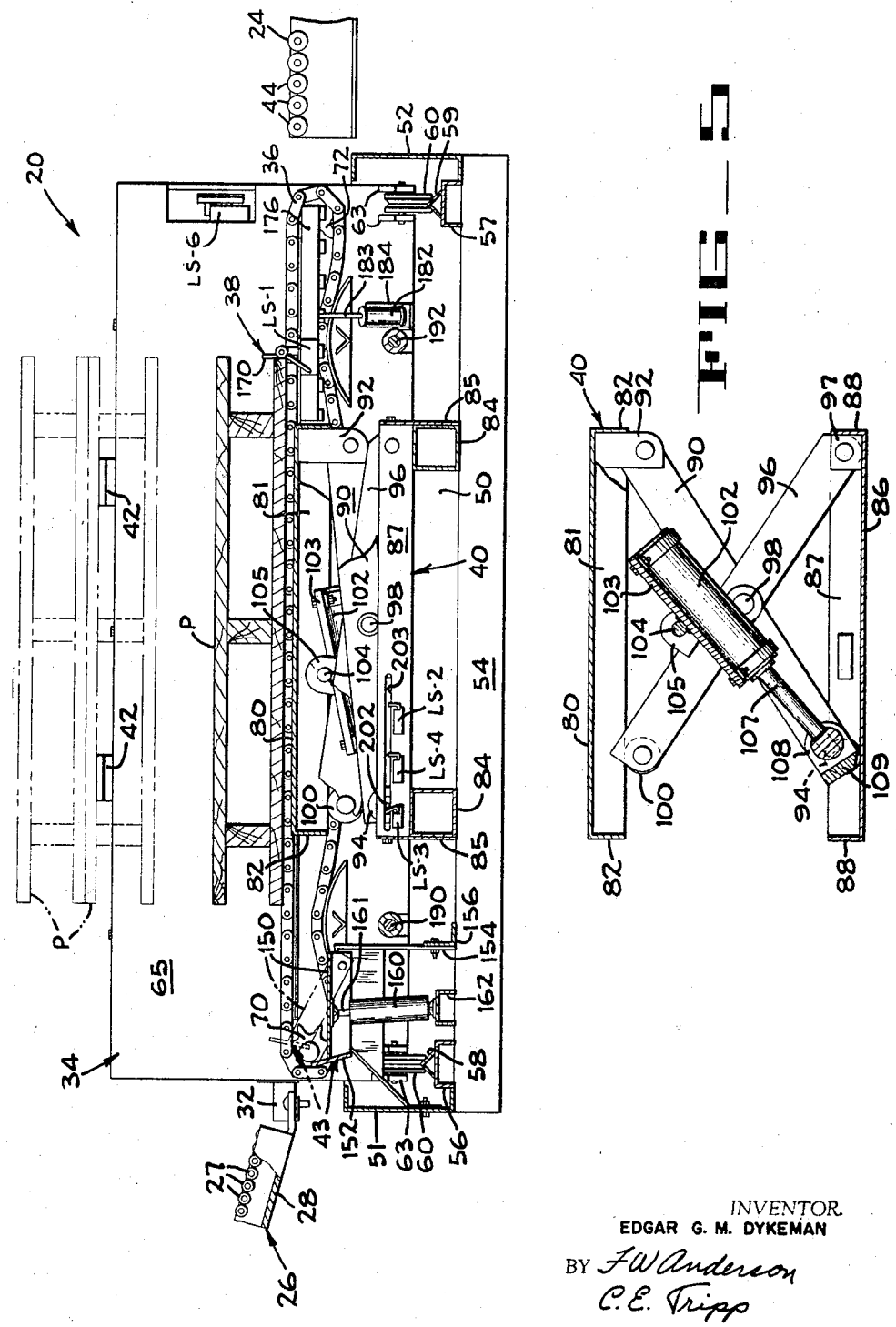

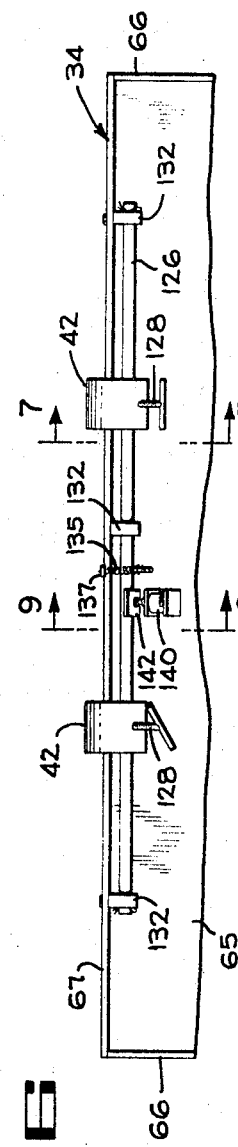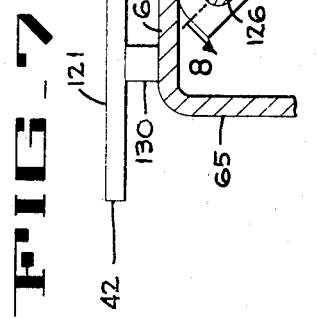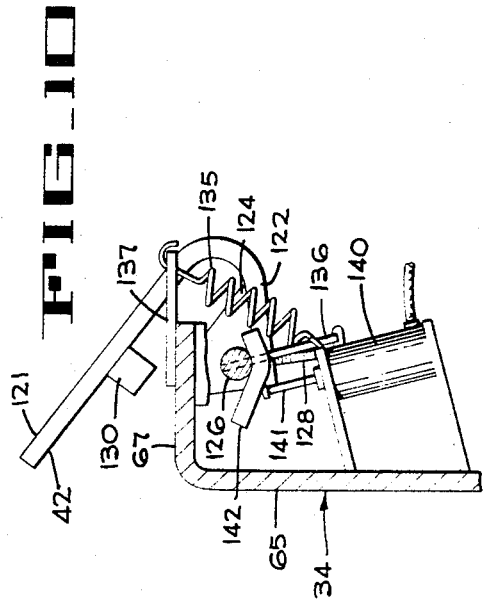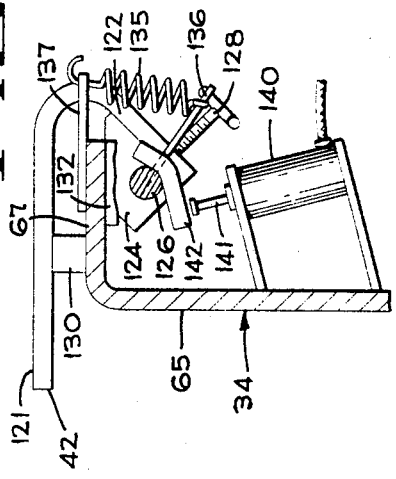

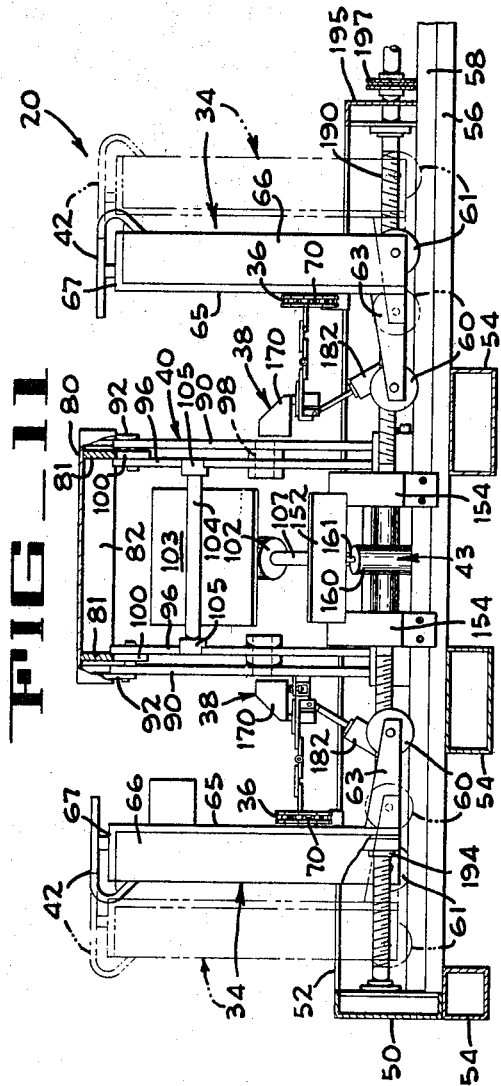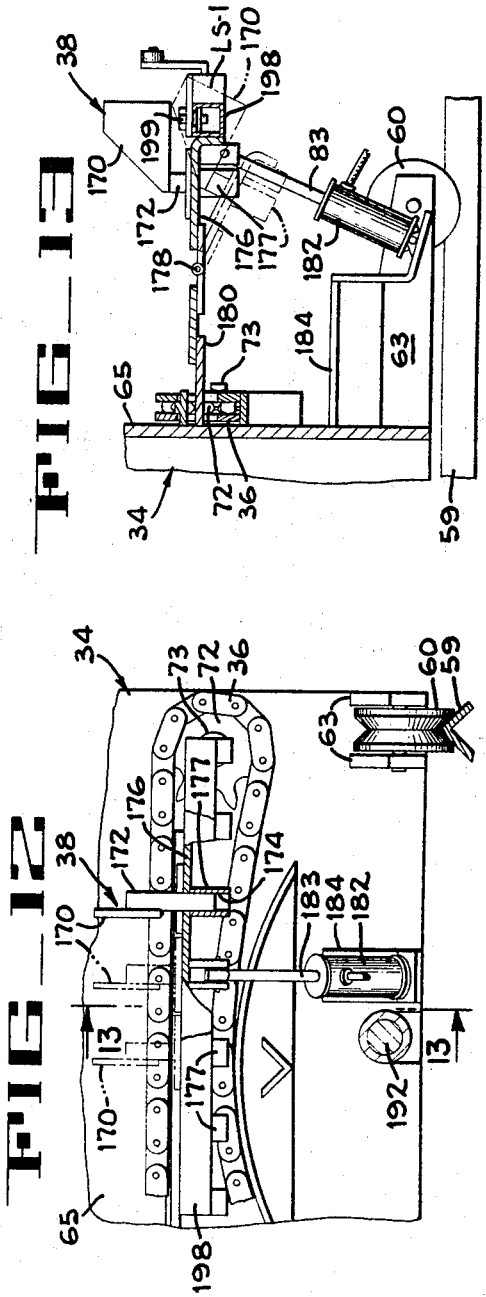

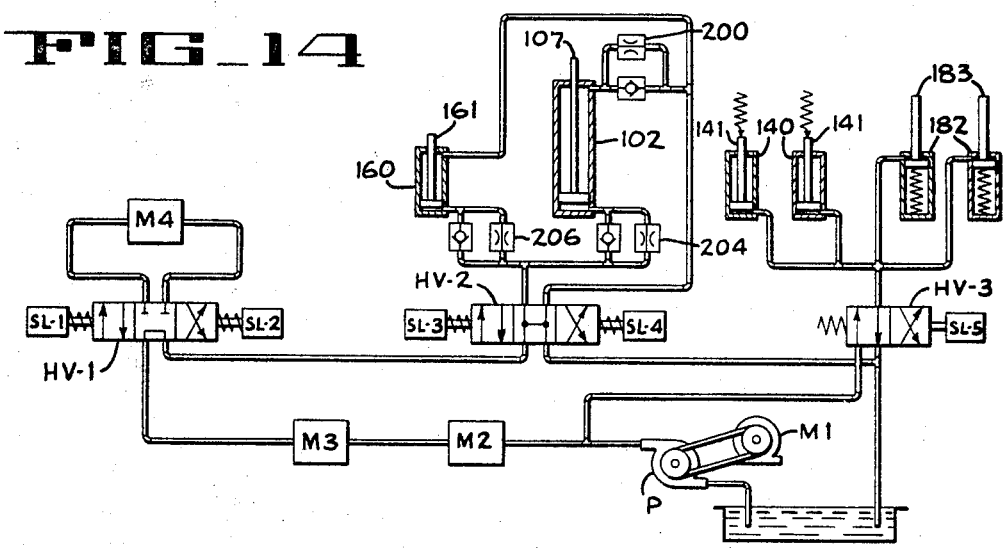
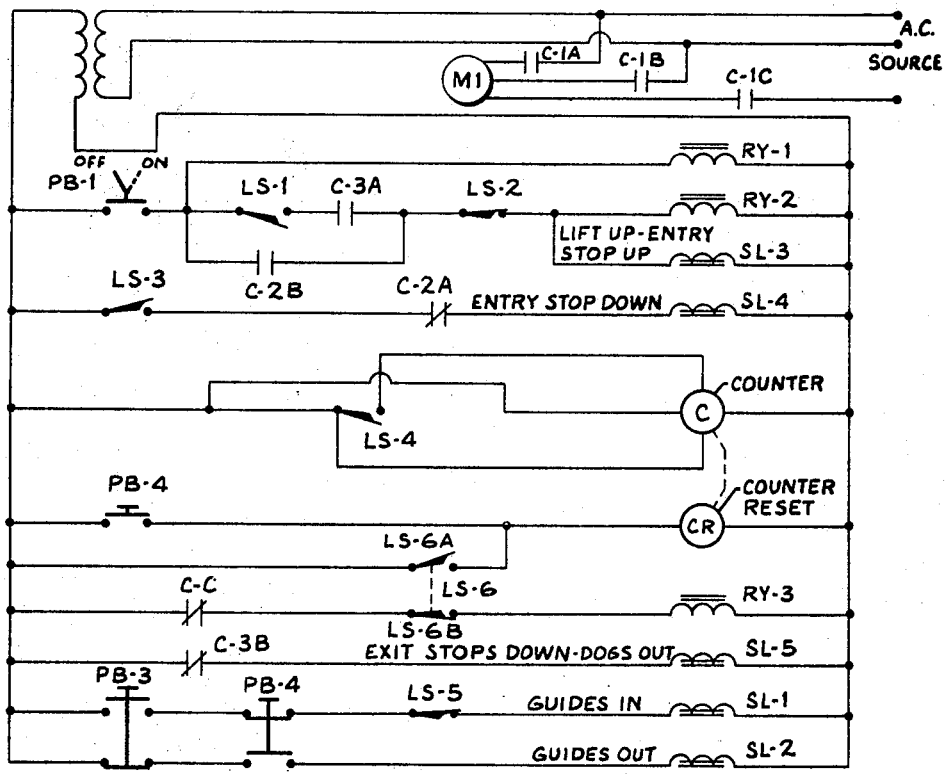

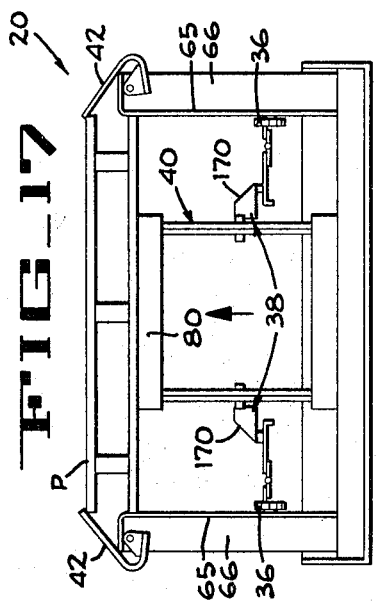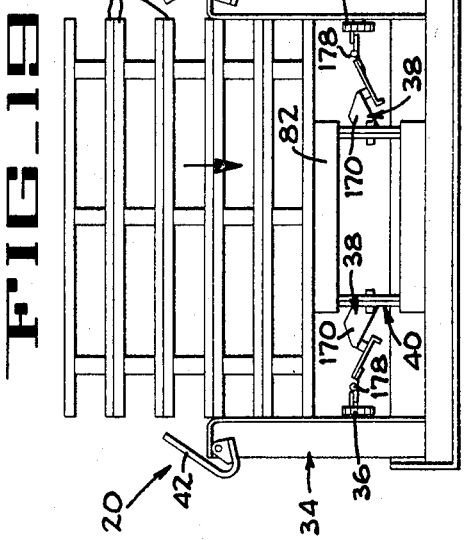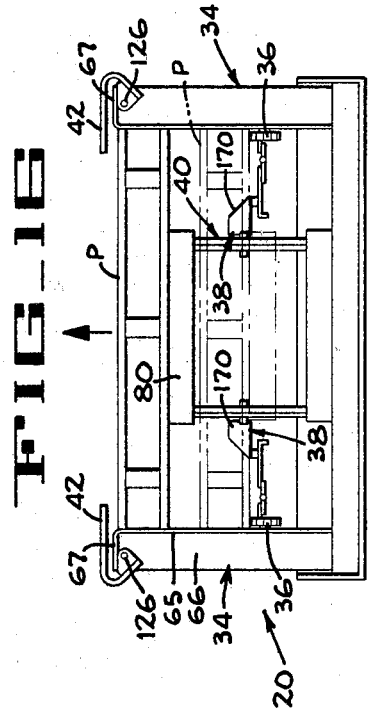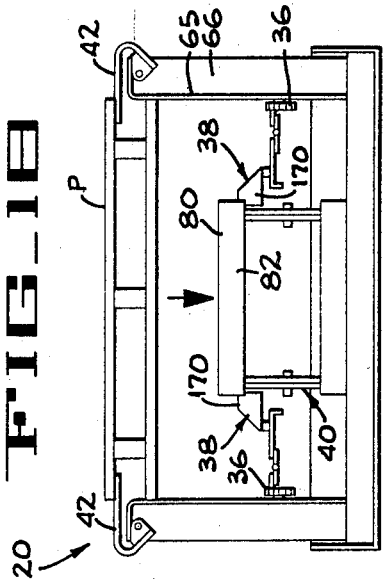

3,478,897
PALLET STACKING APPARATUS
Edgar G. M. Dykeman, Riverside, Calif., assignor to FMC Corporation, San Jose, Calif., a corporation of Delaware
Filed Oct. 12, 1967, Ser. No. 674,860
Int. Cl. B65g 57/16, 15/12
U.S. Cl. 214—6
8 Claims

ABSTRACT OF THE DISCLOSURE

A series of pallets are moved by laterally adjustable endless conveyors over a lift which sequentially lifts each pallet off of the conveyors and carries it upwardly past opposed sets of supporting dogs which are pivoted outwardly by the upwardly moving pallet and are spring-urged inwardly between the decks of the pallet to support it when the lift is lowered. When a predetermined number of pallets have been stacked upon the dogs in the aforedescribed manner, the dogs are locked in their outwardly pivoted positions to allow the stack to descend with the lift and be carried out of the apparatus by the conveyors.

BACKGROUND OF THE INVENTION

Field of the invention

In general, this invention pertains to that field of art concerned with apparatus for piling or stacking articles, and more particularly, it pertains to apparatus for stacking pallets and automatically discharging the stacks of pallets that are formed.

Description of the prior art

A prior art device specifically designed to stack pallets is disclosed in the United States patent to Fenton et al. 2,792,950. This patent describes a movably mounted carriage which is arranged to receive a pallet and to be moved upwardly by a lift mechanism to bring the pallet into supporting engagement with opposed pairs of pivotally mounted dogs. When the carriage and lift combination has stacked a number of pallets in the aforedescribed manner upon the supporting dogs, a fork lift truck or similar device must be brought into position to remove the stack from the apparatus.

The prior art also discloses apparatus for stacking cases or boxes which operate in a manner broadly similar to that of the pallet stacking device of the present invention. For example, the United States patent to Haselton et al. 3,126,104 discloses a case stacking mechanism that includes a conveyor for bringing a case to a lift mechanism which carries it upwardly to engage some supporting dogs and cam them outwardly. The dogs are pushed inwardly beneath the case after it has been lifted past them so that the case will remain supported by the dogs when the lift is returned to the conveyor. In a similar manner, subsequent cases received upon the conveyor are placed at the bottom of a stack of cases thereby formed upon the dogs. The dogs may be positively locked in an outwardly pivoted position after the last case has been picked up by the lift to allow the entire stack of cases to be brought down to the conveyor and carried out of the apparatus.

The United States patent to Raynor 3,235,100 is another prior art patent which discloses an automatic case or carton stacking apparatus. This device includes a conveyor for bringing cases individually into the apparatus where they can be carried upwardly by a lifting mechanism to be placed in supporting engagement with opposed pairs of pivotally mounted dogs. The dogs are positively moved inwardly and outwardly to allow additional cases to be added to the bottom of the stack supported by the dogs, and they can be locked in an outwardly pivoted position to allow the entire stack of cases to be lowered and moved out of the apparatus, in the same general operating manner as that of the previously described case stacking device.

SUMMARY OF THE INVENTION

In the pallet making industry a need has long existed for an efficient and economical apparatus to stack pallets. When pallets are constructed in our modernized manufacturing plants by automatic nailing machines they are produced at a rate such that hand-stacking of the assembled pallets is both slow and uneconomical in view of present labor costs. Some automatic pallet stacking devices have been used to alleviate these problems but they have not proven altogether satisfactory. Generally, these devices have been of complex and costly structure making them uneconomical for purchase by the pallet manufacturer. Also, such devices have, in the past, lacked the automatic stack discharging feature of the present invention and the ability to rapidly adjust to handle pallets of different sizes.

Other pallet stacking devices have been proposed in the past for use with specialized equipment, such as palletizing machines for example, where pallets must be accumulated and dispensed. The pallet stacking devices which are integrated into such machines, however, generally are not compatible with the simple stacking operation required by the pallet making industry and, hence, they have not found any widespread use.

Box or case stacking mechanisms have long been known to the industry, but such devices are not generally commercially useful for the stacking of pallets. One of the problems is that case stacking devices are, of course, designed to operate on cases of solid and compact shape while pallets are constructed with deck members spaced by stringers so that they may be supported between the decks instead of necessarily at the bottom. This permits a special type of supporting dog structure to be utilized in the present invention which would not be practically useful with the prior art case or box stacking devices. Furthermore, the compact and bulky nature of boxes and cases, in contrast to the flat shape of the pallets, requires certain fundamentally different considerations in the design of the conveyors, the stops, and the switches which are present in the stacking apparatus.

The present invention provides a pallet stacking apparatus which permits pallets to be individually brought into the machine between a pair of adjustable side guiding members to a position overlying a lift where they are momentarily held until the lift picks the pallet up and places it on supporting dogs located a short distance above the conveyors. The conveyors are supported by the side guiding members which are readily and uniquely adjustable so that the apparatus of the present invention can be adjusted to handle pallets of different widths even while the conveyors continue to operate. When a complete stack of pallets has been assembled upon the supporting dogs they may be locked in an outwardly pivoted position to allow the stack to be lowered by the lift to the conveyors and automatically discharged from the apparatus.

One of the important features of the present invention is the construction and operation of the supporting dogs which are adjustably mounted upon a freely rotatable bar so that they will be cammed outwardly by the upwardly moving pallet and they can be spring-urged inwardly when the upper deck of the pallet has moved upwardly beyond them to thereby catch the pallet and support it when the lift is subsequently lowered. Clamping means are provided to lock the bar in a rotated position where the dogs will be pivoted out of the path of the moving pallets and the accumulated stack of pallets can be lowered and removed from the apparatus.

Another important feature of the present invention is the exit stop which serves to center the pallets upon the lift, which may be quickly adjusted for handling pallets of different lengths, and which is operable in combination with a system of switches to permit automatic discharge of a stack of pallets from the apparatus.

Brief description of the drawings

FIGURE 1 is a diagrammatic central section through the pallet stacking apparatus of the present invention illustrating its position in a pallet assembling system which also includes a nailing machine and a discharge conveyor.

FIGURE 2 is an enlarged, somewhat diagrammatic, isometric view of the pallet stacking apparatus shown in FIGURE 1 with portions thereof being broken away for the purpose of clarity.

FIGURE 3 is an enlarged plan of the pallet stacking apparatus shown in FIGURE 1 with a portion of the lift mechanism being broken away.

FIGURE 4 is a section taken along the line 4—4 of FIGURE 3 with the upper portion of the lift being broken away.

FIGURE 5 is a longitudinal section through the pallet lift mechanism taken along the line 5—5 of FIGURE 3 and illustrating the lift mechanism in its raised condition.

FIGURE 6 is a fragmentary side elevation of an upper portion of the apparatus taken along the line 6—6 of FIGURE 3 and particularly illustrating the mounting of the pallet supporting dogs.

FIGURE 7 is an enlarged section taken along the line 7—7 of FIGURE 6 showing one of the dogs.

FIGURE 8 is an enlarged section taken along the line 8—8 of FIGURE 7.

FIGURE 9 is an enlarged section taken along the line 9—9 of FIGURE 6 particularly illustrating the lockout mechanism for the dogs in its normal position.

FIGURE 10 is a section similar to FIGURE 9 but illustrating the condition of the dogs and their actuating elements when the lockout mechanism is in its energized position.

FIGURE 11 is a transverse section taken along the line 11—11 of FIGURE 3.

FIGURE 12 is in an enlarged fragmentary section taken along the line 12—12 of FIGURE 3 and particularly illustrating the construction of one of the exit stops.

FIGURE 13 is a section taken along the line 13—13 of FIGURE 12.

FIGURE 14 is a diagrammatic illustration of the hydraulic circuitry incorporated in the stacking apparatus of FIGURE 2.

FIGURE 15 is a schematic of the electrical circuitry for the stacking apparatus of FIGURE 2.

FIGURES 16, 17, 18 and 19 are diagrammatic views illustrating the operation of the stacking apparatus of FIGURE 2.

Description of the preferred embodiment

Referring now to FIGURE 1 of the drawings, the pallet stacking apparatus 20 of the present invention is there shown as it might be used in conjunction with a pallet nailing machine 22 to individually receive the newly constructed pallets P, stack the pallets, and discharge the stacks to a conventional discharge conveyor 24 where they will await pickup by a fork lift truck or other transport vehicle. An automatic nailing machine which would nail together a pallet and discharge it as shown might be one such as is disclosed in the United States patent to Verrinder et al. 2,594,100, for example. A pair of laterally adjustable transfer conveyors 26, each comprising a plurality of rollers 27 which are rotatably mounted within an upstanding channel 28 (see FIGS. 3 and 4), may be adjustably secured to the rear end of the nailing machine by slidable support brackets 30. The transfer conveyors are loosely pivotally mounted at their forward ends upon support brackets 32 which are attached to the leading edges of a pair of upright frame members or guides 34 that are laterally adjustably mounted upon and form a part of the stacking apparatus 20 of the present invention, such frame members serving to guide a finished pallet from the transfer conveyor into position to be stacked. Endless conveyor chains 36 are mounted at the lower portion of the guides 34 to receive the side edges of the pallet. A pallet entering the stacking apparatus upon the conveyor chains 36 will be stopped by a pair of exit stops 38 positioned at the rear end of the apparatus and projecting above the upper run of the chains. When the pallet has been stopped by the exit stops, it is in the correct centered position to be picked up by a lift 40 which will carry it upwardly and place it upon opposed pairs of supporting dogs 42 pivotally mounted to the upper edge of the guides. When the lift starts upwardly, means are provided to elevate an entry stop 43 to prevent a following pallet from entering the machine until the lift has deposited its pallet upon the dogs and returned to its lowermost position. When a predetermined number of pallets have been stacked upon the dogs, the lift will be operated to bring the stack down to the endless chain conveyors 36 which will move the stack out of the apparatus and onto the rollers 44 of the discharge conveyor.

The stacker 20 of the present invention, as viewed in FIGURES 2, 3 and 4, includes side rails 50, a front rail 51, and a rear rail 52, all of which are welded together at their end portions to form a rectangularly shaped frame structure which is mounted upon and supported by longitudinally extending skids 54. A pair of inverted channels 56 and 57 (FIG. 4) are mounted upon the supporting skids at the entrance and exit stations of the stacker adjacent the front rail 51 and the rear rail 52, respectively. Channels 56 and 57 each support an inverted V-shaped track 58 and 59, respectively, which extends laterally across the width of the stacker. The upright guides 34 each include a flat longitudinally extending face wall 65, a pair of side walls 66, and a narrow top wall 67, and they are individually mounted upon the tracks 58 and 59 by means of sets of grooved rollers 60 and 61 at each end of the guide, with the rollers 60 being carried upon supporting brackets 63 that are welded to the lower corners of the opposed walls 65 and with the rollers 61 being rotatably pinned to the laterally extending side walls 66 at the lower edge thereof so that each of the guides will be rollably supported at both its forward and rearward end upon the tracks 58 and 59. The guides are, therefore, mounted so that they may be moved, by means to be disclosed presently, toward or away from each other to positions of different lateral spacing (as shown in the full and phantom line figures of FIGURE 11) to readily adapt the stacker to handle pallets of different widths.

As previously pointed out, the pallets are carried into the stacking apparatus between the upright guides 34 by means of endless conveyor chains 36, the chains being mounted upon the lower portions of the opposed walls 65. At their forward ends, the chains are trained about idler sprockets 70 which are rotatably mounted upon shafts fixed to the walls 65 adjacent the forward edges thereof. The rearward ends of the conveyor chains are trained about drive sprockets 72 carried by drive shafts 73 which are given by separate hydraulic motors M2 and M3 mounted adjacent the outwardly extending faces of the side walls 65 by means of supports 75 (FIG. 2). During operation of the apparatus, the conveyor chains are arranged to be continuously driven by the hydraulic motors M2 and M3.

When a pallet has come to rest upon the chains 36 after engagement with the exit stops 38, the hydraulically operated lift 40, which is centered between the chains, will engage the pallet and lift it vertically. The lift mechanism, as best seen in FIGURES 4 and 5, includes a flat top plate 80 which supports the lower deck of the pallet as it is lifted. The plate 80 has attached thereto a pair of downwardly extending bars 81 slightly offset from the sides thereof and downwardly extending front and rear flanges 82. The lift structure is supported upon a pair of frame members 84 laid transversely across the inner pair of skids 54 and is positioned between a pair of upstanding plates 85 (FIG. 4) attached to the outer faces of the frame members. Mounted upon the frame members 84 between the plates 85 is a base plate 86 which is of generally the same size as the top plate 80 and which includes a pair of upwardly extending side flanges 87 and a pair of upwardly extending front and rear flanges 88 positioned in opposed relationship to the flanges 82 depending from the top plate. A pair of support arms 90 are pivotally mounted upon the top plate 80 between sets of depending brackets 92 attached adjacent the rearward downwardly extending flange 82 at the lateral edges thereof. The lower edge of each of the support arms 90 rotatably supports a roller 94 which is arranged to bear against the upper face of the base plate 86 adjacent each of the side flanges 87 and be rollable therealong. A pair of inner support arms 96 are rotatably pinned to upstanding brackets 97 adjacent the rear flange 88 of the base plate and are pivotally mounted by means of pivot pins 98 at their mid-section to the mid-section of the outer support arms 90. The upper ends of the inner support arms 96 rotatably support rollers 100 which are arranged to ride along the lower edge of the downwardly extending bars 81 on the top plate.

The lift is moved from its lowermost position, as shown in FIGURE 4, into an elevated position, as shown in FIGURE 5, by means of a hydraulic cylinder 102. The cylinder is rigidly secured to a mounting plate 103 that is welded to a support rod 104 which is rotatably received in bearing blocks 105, each of which is affixed to one of the inner support arms 96 at a position slightly above the central pivot pin 98. The piston rod 107 controlled by the lift cylinder 102 is pivotally mounted to the outer support arms 90 by means of a rotatable bearing structure 108 at the free end of the piston rod. The bearing structure is mounted upon a support plate 109 that is rigidly attached to and extends between the inner faces of the outer support arms opposite the rollers 94. It can be seen that extension of the piston rod from the hydraulic cylinder 102 will cause the outer ends of the connected support arms 90 and 96 to pivot apart in scissor-like fashion to permit the attached rollers 94 and 100 to roll along the top of the base plate 86 and the lower edge of the bar 81, respectively, to raise the top plate 80 and the pallet supported thereon.

An important feature of the present invention are the pallet supporting dogs 42 which are mounted upon the top of the guides 34 and are best shown in FIGURES 6 to 10. Each dog (FIG. 7) is of curved shape and includes a flat upper portion 121 mounted to extend over the top wall 67 of the guide and inwardly beyond the side wall 65 of the guide to support the pallets and a lower portion 122 which is bent inwardly about the innermost edge of the top wall of the guide. The inner face of the lower portion 122 mounts a pair of support brackets 124 which are bored to freely rotatably receive a longitudinally extending shaft 126 (FIG. 8). A mounting screw 128 is threaded into the lower section 122 of the dog so that it may be tightened up against the shaft 126 to lock the dog thereon. Attached to the lower face of the upper section 121 of the dog is a block 130 which bears against the upper face of the top wall of the guide when the dog is in its normal position.

Shaft 126, which supports two dogs on each of the guide members 34, is rotatably supported by bearing blocks 132 (FIG. 6) extending from the top wall 67. It can be seen that each of the dogs is thereby slidably mounted upon the shaft 126 so that it can be readily slid into different longitudinal positions and can be clamped in such positions by means of the mounting screw 128 in order to properly support differently sized and differently constructed pallets. While the shaft 126 is restrained only against axial movement and is freely rotatable within the mounting blocks 132, it is continuously urged in a counter-clockwise direction (as viewed in FIGS. 9 or 10) by means of a spring 135 which is connected between a rod 136 that is welded to the shaft and a plate 137 rigidly attached to the upper face of the top wall 67. The spring normally urges the dogs into the down position shown in FIGURE 9 where the blocks 130 bear against the top wall. When it is desired to lock the dogs in an upwardly and outwardly extending position, as shown in FIGURE 10, hydraulic cylinders 140 mounted upon the center of the side walls 65 are actuated so that upwardly extending piston rod 141 will contact curved bearing plates 142 that are welded to the shafts 126 and cause the shafts, and hence the dogs, to be rotated in a clockwise direction as shown in FIGURE 10. In the locked-out position of FIGURE 10, it will be noted that the dogs have been pivoted outwardly beyond the inner face of the side wall 65 of the guide so that the pallets will be free to move downwardly with the lift when they are to be discharged.

The entry stop 43 (FIGS. 2 and 4) which prevents a pallet from entering the stacker while the lift 40 is operating comprises an inverted U-shaped member 150 having a forwardly inclined abutment plate 152 attached to the forward edge thereof. The trailing edge of the member 150 is pivotally mounted (FIG. 4) between a pair of upstanding brackets 154 which are attached to the front rail 51 of the stacking apparatus and to a support angle 156 which is mounted across the inner skids 54. The entry stop is operated by an hydraulic cylinder 160 which is pivotally mounted upon a supporting channel 162 that is also mounted upon the inner pair of skids. The cylinder 160 controls a piston rod 161 which is pivotally attached at its free end to the underside of the member 150 to propel the abutment plate 152 into an upper position, as shown in phantom lines in FIGURE 4, above the upper run of the conveyor chains 36 where it will prevent the entry of a pallet into the stacker.

The exit stops 38, which center the pallets and allow them to be lifted, are best shown in FIGURES 12 and 13. These stops comprise abutment plates 170 that extend transversely to the direction of movement of the pallet and are carried by square rods 172 which may be positioned in any one of a series of holes 174 in a laterally extending pivot plate 176 (FIGS. 2 and 3). Tubular sleeves 177 (FIG. 12) are welded to the underside of the pivot plate about the holes 174 to provide lateral support for the rods 172. By lifting the rods and dropping them into different holes (as shown in the phantom line illustrations in FIGURE 12), it will be apparent that the exit stops may be readily adjusted to handle pallets of different lengths. The pivot plates 176 are hinged at 178 to support members 180 which are secured to the side walls 65 of the guides adjacent the rearward end of the machine. Each of the exit stops are controlled by an hydraulic cylinder 182 which is pivotally mounted to a support bracket 184 welded or otherwise firmly attached to the side wall 65 below the pivot plate. Piston rod 183 which is controlled by the hydraulic cylinder is pivotally mounted at its free end beneath the pivot plate so that the pallet abutment plate 170 can be pulled down below the upper run of the conveyor chains 36, as shown in phantom lines in FIGURE 13, to allow an entire stack of pallets to be discharged from the apparatus at the completion of each cycle of operation.

Another important feature of the present invention is the means for adjustably mounting the side guides 34 so that they can quickly be moved inwardly or outwardly upon the rollers 60 and 61 to laterally adjust the stacker to handle pallets of different widths. For this purpose, a pair of threaded shafts 190 and 192 are mounted within threaded bearings 194 (FIG. 2) which are carried by the guide side walls 65 along their lower edges. The ends of the shafts are journalled in one of the side rails 50 and in a support rail 195 that is secured between the front and rear rails 51 and 52 at one side of the apparatus (FIG. 2). Each shaft contains left-handed threads on one half and right-handed threads on its other half so that rotation of the shafts in a common direction will cause the guides to move in opposite directions, i.e., either inwardly or outwardly from the pallet lift 40. The threaded shafts 190 and 192 are driven by means of an hydraulic motor M4 which is drivingly engaged with the shaft 190 (FIG. 2). The shaft 190 rotatably mounts an endless drive chain 197 which is trained about a sprocket 197a that is fixed to the projecting end of the shaft 192 at the support rail 195 to provide driving power to the shaft 192.

All of the aforementioned motors M2, M3 and M4 are operated by means of an hydraulic pump P which is driven by an electrical motor M1. The pump P also supplies the hydraulic fluid for the lift cylinder 102, the dog lock-out cylinders 140, the entry stop cylinder 160, and the exit stop cylinders 182. As shown in FIGURE 2, the motor M1, pump P, and hydraulic motor M4, along with the operating controls, are mounted along one of the side rails 50 at one side of the machine.

The operation of the pallet stacking apparatus 20 of the present invention will be described in connection with the schematic diagrams of FIGURES 14 and 15 and the operational views of FIGURES 16, 17, 18 and 19. The apparatus is switched on through a push button switch PB–1 to close a relay RY–1 which connects the main drive motor M1 to an alternating current source through the contacts C–1A, C–1B and C–1C. With the motor M1 driving the pump P, the conveyor drive motors M2 and M3, which are connected in series in the main hydraulic circuit, are continuously driven. If it is desired to adjust the position of the side guides 34, a three-position, spring-centered hydraulic valve HV–1 may be actuated to direct hydraulic fluid to the motor M4 controlling the movement of the guides. Valve HV–1 is shown in FIGURE 14 in its center, or neutral, position where hydraulic fluid is bypassed from the motor M4. When push buttons PB–3 or PB–4 are depressed, the solenoids SL–1 or SL–2 will be actuated to move the guides in or out, respectively, the solenoids shifting the valve HV–1 into a position to allow hydraulic flow to the motor M4 as shown in FIGURE 14. A normally closed limit switch LS–5 (FIGS. 2 and 3) is mounted upon one of the skids 54 in a position to be contacted and opened by a side wall 65 of one of the guides when the guides have moved to their innermost positions to break the circuit to the solenoid SL–1 and stop the drive motor M4. It is also to be noted that actuation of the start switch PB–1 will energize a relay RY–3 through the normally closed contact C—C and the normally closed switch portion LS–6B. Energization of relay RY–3 opens the normally closed contact C–3B and closes the normally open contact C–3A to precondition the circuitry for an incoming pallet.

When a pallet is brought into the apparatus upon the chains 36 it will be propelled against the exit stops 38 and it will close a normally open switch LS–1 which is slideably mounted upon a channel bracket 198 that is attached along the inner edge of one of the pivot plates 176 (FIGS. 2 and 13) supporting the exit stops. It can be seen that the switch LS–1 can be readily adjusted in position when the exit stops are adjusted by loosening the thumb screw 199 (FIG. 13) and allowing the switch to be slid along the channel bracket. With the closing of switch LS–1 a circuit will be completed through the closed contact C–3A and a normally closed switch LS–2 to energize a solenoid SL–3 which shifts a three-position, open-centered hydraulic valve HV–2 to the right (as viewed in FIG. 14) to direct hydraulic fluid to the hydraulic cylinder 160 controlling the entry stop 43 and to the hydraulic cylinder 102 controlling the pallet lift 40. The piston rod 161 will immediately lift the entry stop into position to block a further pallet from entering the apparatus, but the piston rod 107 which actuates the lift will be moved at a restricted speed since a flow control valve 200 is positioned in the exhausting line of the cylinder 102. Closing of switch LS–1 will also energize a relay RY–2 to close a normally open contact C–2B to maintain the circuit to the solenoid SL–3 closed after the lift has picked the pallet up. Energization of relay RY–2 also opens the normally closed contact C–2A to de-energize a solenoid SL–4 which has previously shifted the hydraulic valve HV–2 to pull the entry stop down.

FIGURE 16 shows, in phantom lines, the initial position of a pallet P and the lift 40, and, in full lines, the pallet being carried by the lift to the dogs 42. As the lift is thus moving upwardly, a pin 202 projecting from the moving roller 94 attached to the lower end of one of the outer support arms 90 of the lift will move across and actuate a switch LS–4 (FIGS. 2 and 4). Actuation of this switch will signal a counter C to indicate that one pallet has been picked up by the lift. The function of the counter is to count and record each pallet that is stacked and to actuate the mechanism for locking the dogs out when a predetermined number of pallets have been stacked. One mechanism which might, for example, be used to accomplish this function is the Eagle Microflex Counter, Model No. HZ172A601, manufactured by the Eagle Signal Company, a division of the E. W. Bliss Company, of Davenport, Iowa.

When the top deck of the pallet P engages the dogs 42, its further upward movement will cause the dogs to rotate outwardly against the urging of the springs 135, as is shown in the operational view of FIGURE 17. When the top deck of the pallet clears the outwardly pivoted dogs, the dogs will drop between the top deck and the lower deck of the pallet. At about this time, the lift will be moved upwardly far enough so that the projecting pin 202 on the outer support arm, which moves within a slot 203 in the upstanding flange 87, will be moved far enough to contact and open the normally closed switch LS–2. Actuation of switch LS–2 will break the circuits to the solenoid LS–3 and the relay RY–2 and cause the hydraulic valve HV–2 supplying fluid to the lift cylinder 102 and the entry stop cylinder 160 to be shifted to the left and into its neutral, open-centered position as shown in FIGURE 14. When valve HV–2 is in this neutral position, the hydraulic cylinder 102 controlling the lift will exhaust through a flow control valve 204 at a predetermined rate under the weight of the lift structure to lower the lift at a restricted speed. A restrictive flow control valve 206 is placed in the hydraulic line to the entry stop cylinder 160, and this flow control valve should be set so that the piston rod 161 will remain in its extended position to hold the entry stop up in its pallet blocking position when the hydraulic valve HV–2 is in its open-centered position and while the lift is lowered. It will be apparent that the lowering of the lift 40 will leave the upper deck of the pallet supported upon the dogs 42, as is shown in FIGURE 18.

When the lift 40 returns to its lowermost position, the switch-actuating pin 202 will contact the normally open switch LS–3 to close this switch and energize the relay SL–4 through the normally closed contact C–2A. Energization of relay SL–4 will shift the hydraulic valve HV–2 to the left (as viewed in FIG. 14) and will cause an immediate hydraulic pressure differential across the cylinder 160 to force the piston rod 161 and the entry stop 43 down to permit another pallet to enter the stacker upon the chains 36. The entry of a new pallet and its movement to the exit stops 38 will close the switch LS–1 to initiate a new pallet stacking cycle in the aforedescribed manner.

The pallet stacking cycle will be repeated until a predetermined number of pallets have been stacked upon the dogs, with each new pallet being added to the bottom of the stack. When the last pallet to be placed in the stack is on the lift and the counter switch LS-4 has been actuated, the counter will function to open the normally closed contact C—C to de-energize relay RY-3. The de-energization of this relay will close the normally closed contact C-3B to complete a circuit through solenoid SL-5 which will shift a two-position hydraulic valve HV-3 to the left (as viewed in FIG. 14) and direct pressurized fluid to the hydraulic cylinders 140 controlling the dogs 42 and to the hydraulic cylinders 182 controlling the exit stops. Upon the extension of the piston rods 141 from the cylinders 140, the lift will have moved the last pallet into supporting engagement with the stack to permit the dogs to pivot freely and the dogs will be rotated outwardly to the position shown in FIGURE 10. When the piston rods 183 are forced downwardly within the hydraulic cylinders 182, the pivot plates 176 containing the exit stops 38 will be lowered to their depressed positions as shown in FIGURE 19. De-energization of relay RY-3 will also open contact C-3A to prevent any possible subsequent energization of the solenoid SL-3. Subsequently, when the switch LS-2 is opened as the lift reaches its uppermost position, and the direction of movement of the lift is reversed, the dogs will not be permitted to drop between the decks of the lowermost pallet and the entire stack of pallets will be lowered with the descending lift, as shown in FIGURE 19.

The entire stack of pallets are thus lowered to the conveyor chains 36 which will receive the stack and propel it out of the stacker past the lowered exit stops 38 and onto the discharge conveyor 24. As the stack of pallets leaves the apparatus, a limit switch LS-6 mounted upon the trailing edge one of the side guides 34 will be actuated. Actuation of this double-pole, single-throw switch opens the normally closed switch portion LS-6B to prevent the relay RY-3 from being re-energized and closes the normally open switch portion LS-6A to energize a counter reset mechanism CR, which is part of the counter C, to reset the counter to its initial position where it can begin a new count of the pallets that are subsequently brought into the apparatus. When the stack has been moved completely past the switch LS-6, the switch will return to its normal position, as shown in FIGURE 15, and allow the relay RY-3 to be energized by the now-closed contact C—C to close the contact C-3A in the lift circuit to condition this circuit for energization when the switch LS-1 is subsequently actuated by the next pallet entering the apparatus. Contact C-3B will also be opened upon re-energization of the relay RY-3 to de-energize the solenoid SL-5 to permit the hydraulic valve HV-3 to be spring-returned to its blocking position shown in FIGURE 14 and causing the dogs 42 and the exit stops 38 to return to their normal positions. A push-button PB-4 is also provided so that the counter reset can be actuated manually to reset the counter at any desired point in the operating cycle.

From the foregoing description it can be seen that the apparatus of the present invention comprises a simply constructed, rapidly adjustable device which is capable of efficiently stacking a series of spaced pallets and which will automatically discharge the stack thus formed upon the accumulation of a predetermined number of pallets in the stack. By a simple and rapidly accomplished adjustment of the side guides and the pallet exit stops, the apparatus can be adjusted to handle pallets of different widths or lengths, with these adjustments being capable of being made even while the apparatus continues to operate. The pallet supporting dogs of the present apparatus are also easily adjustable, and they are mounted in such a manner that they do not require a pushing or pulling element to insert them between or retract them from between the pallets.

Although the best mode contemplated for carrying out the present invention has been herein shown and described, it will be apparent that modification and variation may be made without departing from what is regarded to be the subject matter of the invention.

Having completed a detailed description of the invention so that those skilled in the art could practice the same, I claim:

1. A pallet stacking apparatus comprising a pair of upright guide members, means mounting said guide members in parallel relationship, conveyor means for moving a pallet into said apparatus, lift means normally positioned below said conveyor means, means for elevating said lift means to lift said pallet upwardly off of said conveyor means, pallet supporting dogs comprising elongated members each having an inner portion extending into the path of said pallet and an outer portion attached to the adjacent guide member, means pivotally mounting the outer portions of said dogs upon said guide members above said conveyor means to permit them to be engaged by and pivoted outwardly by a pallet moved upwardly on said lift means, and spring means connected between said dogs and said guide members to automatically urge the inner portions of said dogs inwardly beneath an upper edge of said pallet as soon as the upper portion of the pallet has moved upwardly past the dogs whereby said pallet will be supported upon said dogs when said lift means is subsequently stopped and lowered to said conveyor means, and means for positively restraining said dogs in their outwardly pivoted positions when said lift means is in its elevated position to permit a stack of pallets formerly supported upon said dogs to be carried downwardly by said lift means to said conveyor means for removal from said apparatus, said last named means being operative until said stack of pallets has been completely removed from the path of said lift means, said dogs being slideably mounted upon a pair of pivot shafts extending along said guide members, means for clamping each of said dogs to one of said pivot shafts, said pivot shafts being spring urged for axial rotation in one direction by said spring means to place said dogs in their pallet supporting positions and being rotatable in the other direction by said dog restraining means to pivot the dogs outwardly away from the path of said pallets.

2. A pallet stacking apparatus comprising a pair of upright guide members, means mounting said guide members in parallel relationship, endless conveyors mounted on the inner opposed faces of said guide members for moving a pallet into said apparatus, drive means for continuously driving said conveyors during operation of said apparatus, lift means positioned between said conveyors for lifting said pallet upwardly off of said conveyors, pallet supporting dogs pivotally mounted on each of said guide members above said conveyors for supporting the pallets carried upwardly by said lift means, and means for moving said guide members toward or away from each other to adjust said conveyors for pallets of different widths, said last named means being operative during operation of said pallet stacking apparatus and while said conveyors are being continuously driven.

3. A pallet stacking apparatus according to claim 2 wherein said means for moving the guide members comprises a shaft having first and second threaded portions thereon, said first threaded portion being provided with right-handed threads and being threadedly engaged with one of said guide members and said second threaded portion being provided with left-handed threads an being threadedly engaged with the other of said guide members, and means for rotating said shaft to cause said guide members to be moved together or apart.

4. A pallet stacking apparatus according to claim 3 including rollers mounted at each longitudinal end of said guide members, and a pair of transverse tracks at the front and rear portions of the stacking apparatus arranged to receive said rollers and thereby rollably support said guide members.

5. A pallet stacking apparatus according to claim 2 including an exit stop positioned adjacent the downstream end of said endless conveyors above the level of said conveyors for stopping a pallet on the conveyors until it can be picked up by said lift means, means for adjustably mounting said exit stop to permit it to be moved into different longitudinal positions relative to said endless conveyors to adapt the stop to handle pallets of different lengths, and means for pivoting said exit stop below the upper level of said conveyors when a stack of pallets is to be discharged from the apparatus.

6. A pallet stacking apparatus according to claim 5 including a pivot plate for supporting said stop, said pivot plate being provided with a plurality of longitudinally arranged apertures, said stop being loosely received within one of said apertures, and a pull rod connected to said pivot plate to pivot said plate downwardly to a position wherein said stop is below said upper level of the conveyors.

7. A pallet stacking apparatus comprising a pair of upright guide members mounted in parallel spaced relationship to define an entrance station and an exit station, conveyor means for moving a pallet past said entrance station between said guide members and into said apparatus, stop means at said exit station normally positioned above said conveyor means to stop said pallet on said conveyor means, lift means normally positioned below said conveyor means, a first switch engageable by said pallet for actuating said lift means to lift said pallet upwardly from the stopped position against said stop means, pallet supporting dogs pivotally mounted on each of said guide members above said conveyor means for supporting the pallets carried upwardly by said lift means, a second switch actuatable by said lift means for stopping the upward movement of the lift means when at least a portion of said pallet has been elevated above said dogs and for causing the lift means to be lowered to leave said pallet supported by said dogs, a third switch actuatable by said lift means when it is moving upwardly, a counter electrically connected with said third switch and being operable after a predetermined number of pallets have been moved upwardly by said lift means for locking said dogs in an outwardly pivoted position to permit the entire stack of pallets to be lowered on said lift means to said conveyor means, said counter also being operable to lower said stop means to permit said stack of pallets to be moved past said exit station by said conveyor means, and a fourth switch engageable by said stack of pallets for returning said dogs to their inwardly pivoted positions and for raising said stop means to its normal position above said conveyor means after said stack has been moved past said stop means.

8. A pallet stacking apparatus according to claim 7 including a second stop means positioned at said entrance station, said first switch also being operable to cause said second stop means to be projected into the path of said conveyor means to prevent a pallet from moving past said entrance station while said lift means is operating, and a fifth switch means engageable by said lift means when it is returned to its lowermost position for lowering said second stop means.

References Cited

UNITED STATES PATENTS

| | | |
|---|---|---|
| 2,792,950 | 5/1957 | Fenton et al. |
| 2,857,040 | 10/1958 | Campbell. |
| 2,948,382 | 8/1960 | Russell. |
| 3,013,369 | 12/1961 | Wilson et al. |
| 3,039,624 | 6/1962 | Campbell. |
| 3,054,515 | 9/1962 | Nawman. |
| 3,086,665 | 4/1963 | Schmid. |
| 3,126,104 | 3/1964 | Haselton et al. |
| 3,235,100 | 2/1966 | Raynor. |
| 3,282,566 | 11/1966 | Clarke. |
| 3,330,425 | 7/1967 | Reda. |

GERALD M. FORLENZA, Primary Examiner

R. J. SPAR, Assistant Examiner

U.S. Cl. X.R.

198—190

PO-,050
(5/69)

UNITED STATES PATENT OFFICE
CERTIFICATE OF CORRECTION

Patent No. 3,478,897     Dated November 18, 1969

Inventor(s) E. G. M. DYKEMAN

It is certified that error appears in the above-identified patent and that said Letters Patent are hereby corrected as shown below:

Column 4, line 8, "conveyor" should be --conveyors--. Column 4, line 65, "given" should be --driven--.

Signed and sealed this 27th day of April 1971

(SEAL)
Attest:

EDWARD M. FLETCHER, JR.          WILLIAM E. SCHUYLER, JR.
Attesting Officer                Commissioner of Patents